Figure 1:
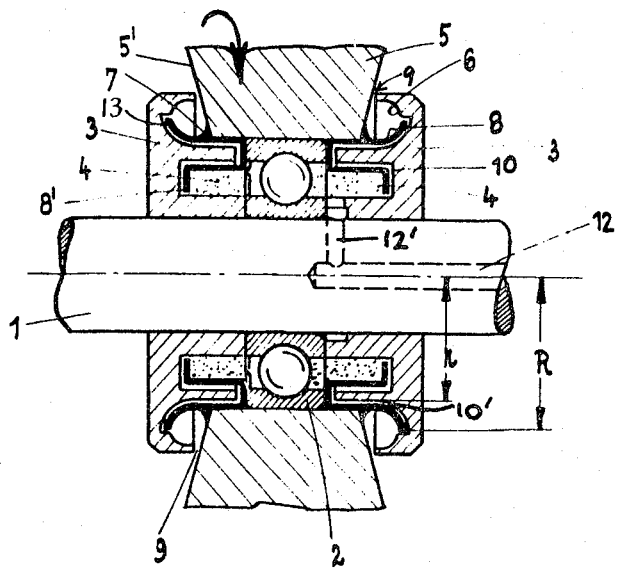

United States Patent

[11] 3,602,559

| [72] | Inventor | Josef Hirschler<br>Johann-Sebastian-Bach-Gasse 27, 8010<br>Graz, Austria |
|---|---|---|
| [21] | Appl. No. | 879,373 |
| [22] | Filed | Nov. 24, 1969 |
| [45] | Patented | Aug. 31, 1971 |
| [32] | Priority | Nov. 25, 1968 |
| [33] | | Austria |
| [31] | | A11447/68 |

[54] SEAL FOR ANTIFRICTION BEARING
5 Claims, 2 Drawing Figs.

[52] U.S. Cl. .................................................. 308/187.1,
277/57, 277/133
[51] Int. Cl. ...................................................... F16c 33/78
[50] Field of Search .......................................... 308/187.1,
187.2, 36.4; 277/25, 95, 57, 133

[56] References Cited
UNITED STATES PATENTS

| 2,862,733 | 12/1958 | Reiersen .................. | 308/36.3 |
| 3,042,417 | 7/1962 | Derman et al. ............... | 277/25 |

Primary Examiner—Martin P. Schwadron
Assistant Examiner—B. L. Grossman
Attorney—Kurt Kelman ABSTRACT: A seal for an antifriction bearing comprises a chamber in a slot between the fixed and rotatable member which surrounds the bearing. The slot has an axial component leading from the bearing to the chamber and a radial component leading from the chamber to the atmosphere. Upon rotation, dirt will be centrifugally removed or prevented from entering through the slot to the bearing.

PATENTED AUG 31 1971    3,602,559

INVENTOR.
JOSEF HIRSCHLER
BY
AGENT

SEAL FOR ANTIFRICTION BEARING

The present invention relates to an improved seal or gasket for an antifriction bearing, wherein the bearing is mounted between a fixed member and a member rotatable in respect of the fixed member about an axis of rotation, and the members define therebetween a slot outwardly adjacent the antifriction bearing.

Bearings for rotatable machine parts operating in an atmosphere containing dust, other dirt or moisture, etc., must be protected against such damaging media by effective seals to prevent the early destruction of the bearings.

If gaskets are used which frictionally engage the members, frictional losses will be encountered and, furthermore, the gaskets are soon worn out. Also, the surfaces subject to frictional engagement require careful polishing which greatly increases the cost of the machinery, particularly in cases where there are many such bearings, as in endless conveyors running on supporting rollers.

While contact-free seals are not subject to these disadvantages, they have been found not always to be effective and to require a sealing medium filling the seal to be effective while the machinery stands still. This requires repeated servicing.

It has also been proposed to use centrifugal force in such contact-free seals for preventing the penetration of dirt towards the bearing by such force and without the use of a sealing medium.

It is one of the objects of this invention to provide a simple bearing seal requiring a minimum of servicing with a maximum of protection and operating life.

It is another object of the invention to provide such a seal which may be readily manufactured and mounted with a minimum of expense.

It is also an object of the present invention to provide a seal making use of centrifugal force for preventing the penetration of dirt and moisture and which is also effective against such penetration while the rotatable member stands still.

It is a more specific object of this invention to provide such a contact-free seal which may contain a sealing medium and which is so constructed that the sealing medium will not be removed by the centrifugal force.

The above and other objects and advantages are accomplished in accordance with the invention by a slot having a first component extending substantially radially in respect of the axis of rotation and a second component extending substantially parallel to the axis. The rotatable member has a recess defining a chamber with the fixed member, and the slot components are in communication with the chamber. The radially extending slot components leads to the surrounding atmosphere and the axially extending slot component leads towards the antifriction bearing.

Figure 2:
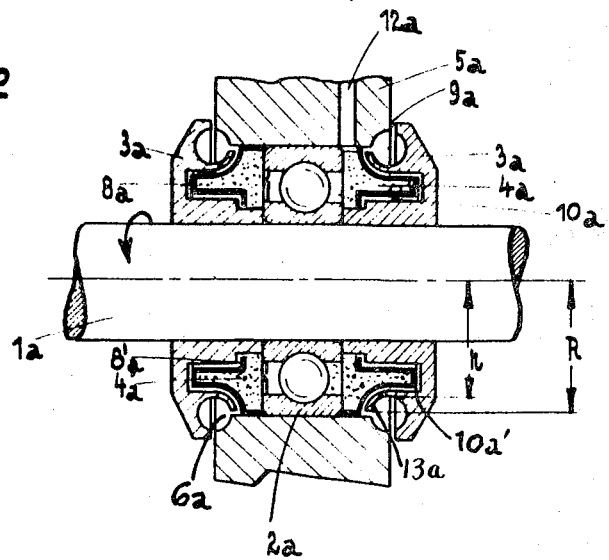

The invention will be more fully understood by reference to the following detailed description of two now preferred embodiments, taken in conjunction with the accompanying drawing wherein FIG. 1 shows a partial axial section of one embodiment of the invention; and FIG. 2 shows the same section of another embodiment.

Referring now to the drawing and first to FIG. 1, there is shown a fixed axle 1 and a rotatable body 5, with ball bearing 2 mounted between the fixed axle and the body 5 which is rotatable in respect thereof. A body 3 is fixedly mounted on, or integral with, axle 1, the axle and the body 3 constituting together a fixed member which defines a labyrinth slot 10 with the rotatable member 5, which slot is outwardly adjacent and surrounds the antifriction bearing 2. In the illustrated embodiments, a sealing medium, such as grease, fills a chamber surrounding the ball bearing 2 but such a sealing medium is not essential for the purposes of the present invention.

As will be seen, the slot 10 has a first component 9 which extends substantially radially in respect of the axis of rotation and leads to the surrounding atmosphere, and a second component 10' which extends substantially parallel to the axis. The body 3 of the fixed member has a recess 6 which defines a chamber with the radially obliquely extending surface 5' of the rotatable member 5 and the sealing lip 13 extending about member 5. The illustrated recess is semitoroidal, i.e. its cross section is substantially semicircular. The slot components 9 and 10' are in communication with the chamber 6, and the axially extending second slot component 10' leads from the chamber 6 towards the ball bearing 2.

In the illustrated embodiment, a cup-shaped sealing element or gasket 8 is mounted in the labyrinth slot. This element has one portion extending through the slot component 10' and a sealing lip portion 13 forming a wall of the chamber 6 so as to collect any dirt or moisture 7 which may have penetrated through radial slot component 9 from the surrounding atmosphere. This sealing element may consist of sheet metal or of a suitable synthetic resin which may be molded or cast. In the embodiment of FIG. 1, the sealing element 8 is fixed on rotatable member 5 and rotates therewith. The sealing element extends inwardly through the entire labyrinth slot and ends in a radially and inwardly extending flange 8' which delimits the chamber filled with sealing grease 4.

As soon as the member 5 begins to rotate, any dirt or moisture 7 accumulated in the chamber 6 is accelerated and centrifugally removed along surface 5' through radial slot component 9. As will be appreciated, the cup-shaped sealing element 8 constitutes a collection container for penetrating dirt or moisture, and such dirt or moisture could enter through the slot 10 and thus reach the bearing only if it reaches the rim of the container, which is not a practical likelihood. Therefore, in accordance with an important characteristic of the invention, the axially extending second slot component has an outwardly extending portion terminating in the chamber 6 at a point removed from the axis a distance $R$ which is farther from the axis than the distance $r$ of the second slot component 10'. In other words, the rim of the cup-shaped sealing element 8 is farther removed from the axis of rotation than the bottom of the sealing element.

The embodiment of FIG. 2 is quite similar and its operation will be obvious from the preceding description of FIG. 1. In this embodiment, however, a fixed body 5a surrounds a rotatable shaft 1a, with the ball bearing 2a mounted between the shaft which is rotatably journaled in body 5a. The body 3a is fixedly mounted on, or integral with, shaft 1a, a labyrinth slot 10a being defined between the fixed and rotatable members. Again, sealing grease 4a fills a chamber surrounding the ball bearing.

Again, the slot 10a has a first component 9a and a second component 10a', these slot components being in communication with a toroidal chamber 6a which is defined by cooperating recesses in bodies 3a and 5a, with which the slot components are in communication, a sealing lip portion 13a extending inwardly from rotatable body 3a and facing slot component 9a to form a wall of chamber 6a. Furthermore, a like cup-shaped sealing element 8a with a radial flange 8a' is provided. However, while the sealing element 8 is supported on rotatable body 5 and rotates therewith, the sealing element 8a is supported on fixed body 5a and does not rotate. In each case, it is a part of the outer member of the assembly.

Also in both embodiments, the sealing medium or grease is introduced into the bearing through the fixed member. In the embodiment of FIG. 1, an axially extending bore 12 in axle 1 has a radially extending component 12' leading to the grease chamber so that the grease 4 may be introduced through bores 12, 12'. In FIG. 2, a bore 12a is shown in the fixed body 5a for introducing the grease 4a.

The provision of a toroidal chamber of relatively large volume, which preferably has a circular or similar cross section, prevents the accumulation of sticky dirt in conical slots and thus makes it possible for liquid dirt to flow out when the rotatable member stands still. Solid dirt particles are removed centrifugally when the rotatable member rotates, as they hit the sealing element. The centrifugally moved particles will be thrown out through the radial slot component and penetration of such particles into the interior will be prevented because the second slot component forms substantially a right angle with the first slot component. Thus, the effectiveness of the seal does not depend on the width of the radial slot component which opens to the surrounding atmosphere.

The inner flange 8' or 8a' of the gasket 8 delimits the sealing grease chamber and thus prevents the grease from being centrifugally removed from this chamber.

It will be advantageous to make the body 3 or 3a and the gasket 8 or 8a of synthetic resin, preferably thermoplastic synthetic resin, which makes it possible to mount and hold these parts on their supporting members by elastic force since such resins have a certain resilience.

I claim:

1. The combination of an antifriction bearing mounted between a fixed member and a member rotatable in respect of the fixed member about an axis of rotation, and a seal for the bearing, wherein the members define therebetween a slot outwardly adjacent the antifriction bearing, the slot having a first component extending substantially radially in respect of the axis and leading to the surrounding atmosphere, and a second component extending substantially parallel to the axis, the rotatable member having a sealing lip facing the first slot component and forming a chamber with a recess in the fixed member, and said slot components being in communication with the chamber, the axially extending second slot component leading from the chamber towards the antifriction bearing.

2. The combination of claim 1, wherein the chamber is of substantially toroidal cross section.

3. The combination of claim 1, wherein the sealing lip terminates at a point farther from the axis than the second slot component is from said axis in a radial direction.

4. The combination of claim 1, wherein the rotatable member and the sealing lip thereof constitute a major portion of the chamber.

5. The combination of claim 1, further comprising a sealing element mounted in the second slot component, the sealing element having a radially and inwardly extending flange, and a sealing medium filling a chamber defined between the sealing element flange and the antifriction bearing.